(12) United States Patent
Saliba et al.

(10) Patent No.: US 7,743,026 B2
(45) Date of Patent: Jun. 22, 2010

(54) REDIRECTION TO LOCAL COPIES OF SERVER-BASED FILES

(75) Inventors: Hani Saliba, Seattle, WA (US); Mingquan Xue, Issaquah, WA (US); Dustin Friesenhahn, Redmond, WA (US); Brandon V. Taylor, Issaquah, WA (US); Mitika Gupta, Kirkland, WA (US); Raj B. Merchant, New York, NY (US); Hai Liu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 11/343,957

(22) Filed: Jan. 31, 2006

(65) Prior Publication Data
US 2007/0198657 A1    Aug. 23, 2007

(51) Int. Cl.
*G06F 17/30* (2006.01)
(52) U.S. Cl. .................. 707/638; 707/661; 707/687; 707/783; 709/214; 709/217
(58) Field of Classification Search .................. 709/217, 709/214; 707/8, 9, 10, 204, 205
See application file for complete search history.

(56) References Cited

U.S. PATENT DOCUMENTS

| | | | |
|---|---|---|---|
| 5,121,499 A | 6/1992 | McCaskill et al. | 715/503 |
| 5,175,810 A | 12/1992 | Young et al. | 715/509 |
| 5,247,611 A | 9/1993 | Norden-Paul et al. | 707/504 |
| 5,255,356 A | 10/1993 | Michelman et al. | 707/504 |
| 5,319,777 A | 6/1994 | Perez | 707/10 |
| 5,359,729 A | 10/1994 | Yarnell et al. | 707/2 |
| 5,396,587 A | 3/1995 | Reed et al. | 707/503 |
| 5,418,898 A | 5/1995 | Zand et al. | 707/503 |
| 5,418,902 A | 5/1995 | West et al. | 707/503 |
| 5,455,853 A | 10/1995 | Cebulka et al. | 379/201.03 |
| 5,471,575 A | 11/1995 | Giansante | 707/503 |
| 5,510,980 A | 4/1996 | Peters | 707/503 |
| 5,535,324 A | 7/1996 | Alvarez et al. | 707/503 |
| 5,553,215 A | 9/1996 | Kaethler | 707/503 |
| 5,598,519 A | 1/1997 | Narayanan | 707/504 |

(Continued)

FOREIGN PATENT DOCUMENTS

EP    1452981    9/2004

(Continued)

OTHER PUBLICATIONS

"Mapping Windows XP Professional to Your Business Needs", Microsoft: Windows XP Resource Kits, http://www.microsoft.com/resources/documentation/Windows/XP/all/reskit/en-us/Default.asp?url=/resources/documentation/Windows/XP/all/reskit/en-us/prba_dwp_tnvo.asp, printed Dec. 15, 2005, 8 pp.

(Continued)

*Primary Examiner*—Hosain T Alam
*Assistant Examiner*—Syling Yen
(74) *Attorney, Agent, or Firm*—Merchant & Gould P.C.

(57) ABSTRACT

Mapping a server file to a corresponding locally stored copy of a server file and redirecting an application to a server file or to a corresponding local copy of the server file are provided for opening a most up-to-date and/or most reliable version of the desired file.

20 Claims, 3 Drawing Sheets

U.S. PATENT DOCUMENTS

| | | | |
|---|---|---|---|
| 5,600,584 A | 2/1997 | Schlafly | 707/504 |
| 5,604,854 A | 2/1997 | Glassey | 707/504 |
| 5,615,373 A | 3/1997 | Ho | |
| 5,649,192 A | 7/1997 | Stucky | 707/103 R |
| 5,685,001 A | 11/1997 | Capson et al. | 707/503 |
| 5,701,499 A | 12/1997 | Capson et al. | 707/503 |
| 5,708,827 A | 1/1998 | Kaneko et al. | 707/503 |
| 5,740,370 A | 4/1998 | Battersby et al. | 709/219 |
| 5,752,253 A | 5/1998 | Geymond et al. | 707/503 |
| 5,758,337 A | 5/1998 | Hammond | 707/6 |
| 5,768,158 A | 6/1998 | Adler et al. | 716/11 |
| 5,812,983 A | 9/1998 | Kumagai | 707/503 |
| 5,819,293 A | 10/1998 | Comer et al. | 707/503 |
| 5,838,965 A | 11/1998 | Kavanagh et al. | |
| 5,864,854 A | 1/1999 | Boyle | |
| 5,881,381 A | 3/1999 | Yamashita et al. | 707/503 |
| 5,890,174 A | 3/1999 | Khanna et al. | 707/504 |
| 5,893,920 A | 4/1999 | Shaheen et al. | |
| 5,913,033 A * | 6/1999 | Grout | 709/219 |
| 5,920,725 A | 7/1999 | Ma et al. | 717/181 |
| 5,926,822 A | 7/1999 | Garman | 707/504 |
| 5,944,789 A * | 8/1999 | Tzelnic et al. | 709/214 |
| 5,966,716 A | 10/1999 | Comer et al. | 707/203 |
| 5,987,481 A | 11/1999 | Michelman et al. | 707/503 |
| 6,021,413 A | 2/2000 | Vaduvur et al. | |
| 6,055,548 A | 4/2000 | Comer et al. | 707/538 |
| 6,055,549 A | 4/2000 | Takano | 707/503 |
| 6,070,177 A | 5/2000 | Kao et al. | 715/500 |
| 6,112,214 A | 8/2000 | Graham et al. | 707/539 |
| 6,119,151 A | 9/2000 | Cantrell et al. | |
| 6,134,552 A * | 10/2000 | Fritz et al. | 707/10 |
| 6,134,563 A | 10/2000 | Clancey et al. | 707/503 |
| 6,134,583 A * | 10/2000 | Herriot | 709/217 |
| 6,138,130 A | 10/2000 | Adler et al. | 707/504 |
| 6,151,601 A | 11/2000 | Papierniak et al. | 707/10 |
| 6,151,624 A | 11/2000 | Teare et al. | 709/217 |
| 6,216,139 B1 | 4/2001 | Listou | 707/503 |
| 6,292,811 B1 | 9/2001 | Clancey et al. | 707/538 |
| 6,334,158 B1 * | 12/2001 | Jennyc et al. | 719/328 |
| 6,341,291 B1 | 1/2002 | Bentley et al. | |
| 6,374,268 B1 | 4/2002 | Testardi | 707/205 |
| 6,477,527 B2 | 11/2002 | Carey et al. | 707/4 |
| 6,510,439 B1 * | 1/2003 | Rangarajan et al. | 707/201 |
| 6,542,933 B1 | 4/2003 | Durst, Jr. et al. | 709/229 |
| 6,567,822 B1 | 5/2003 | Cudahy et al. | 707/104.1 |
| 6,631,519 B1 | 10/2003 | Nicholson et al. | |
| 6,640,234 B1 | 10/2003 | Coffen et al. | 707/538 |
| 6,694,321 B1 | 2/2004 | Berno | 707/101 |
| 6,785,704 B1 | 8/2004 | McCanne | 718/105 |
| 6,820,088 B1 | 11/2004 | Hind et al. | 707/101 |
| 7,062,502 B1 | 6/2006 | Kesler | 707/102 |
| 7,139,768 B1 | 11/2006 | Janzig et al. | |
| 7,174,327 B2 | 2/2007 | Chau et al. | 707/3 |
| 7,222,294 B2 | 5/2007 | Coffen et al. | 715/504 |
| 7,225,189 B1 | 5/2007 | McCormack et al. | 707/10 |
| 2002/0049764 A1 | 4/2002 | Boothby et al. | 707/100 |
| 2002/0052769 A1 | 5/2002 | Navani et al. | 705/7 |
| 2002/0063734 A1 | 5/2002 | Khalfay et al. | |
| 2002/0087729 A1 | 7/2002 | Edgar | 709/246 |
| 2002/0184043 A1 | 12/2002 | Lavorgna et al. | 705/1 |
| 2003/0046366 A1 * | 3/2003 | Pardikar et al. | 709/219 |
| 2003/0145224 A1 | 7/2003 | Bailey | 726/5 |
| 2003/0154191 A1 | 8/2003 | Fish et al. | 707/2 |
| 2003/0154197 A1 | 8/2003 | Millet et al. | 707/9 |
| 2003/0158947 A1 | 8/2003 | Bloch et al. | 709/227 |
| 2003/0159089 A1 | 8/2003 | DiJoseph | 714/38 |
| 2003/0225758 A1 | 12/2003 | Yamasaki | 707/3 |
| 2004/0001106 A1 | 1/2004 | Deutscher et al. | 345/838 |
| 2004/0039743 A1 | 2/2004 | Maleport et al. | 707/10 |
| 2004/0103365 A1 | 5/2004 | Cox | 715/503 |
| 2004/0133652 A1 | 7/2004 | Miloushev et al. | |
| 2004/0138815 A1 | 7/2004 | Li et al. | 702/2 |
| 2004/0172424 A1 * | 9/2004 | Edelstein et al. | 707/201 |
| 2004/0193969 A1 | 9/2004 | Nemoto et al. | 714/100 |
| 2004/0236777 A1 * | 11/2004 | Pardikar et al. | 707/100 |
| 2005/0034064 A1 | 2/2005 | Meyers et al. | 715/513 |
| 2005/0069361 A1 | 3/2005 | Wang et al. | 400/61 |
| 2005/0080823 A1 * | 4/2005 | Collins | 707/200 |
| 2005/0091253 A1 | 4/2005 | Cragun et al. | 707/102 |
| 2005/0172261 A1 | 8/2005 | Yuknewicz et al. | 717/106 |
| 2005/0187897 A1 | 8/2005 | Pawar et al. | 707/1 |
| 2005/0228990 A1 | 10/2005 | Kato et al. | 713/167 |
| 2006/0004815 A1 | 1/2006 | Murata et al. | |
| 2006/0020586 A1 | 1/2006 | Prompt et al. | |
| 2006/0095447 A1 | 5/2006 | Dickinson et al. | 707/100 |
| 2006/0101038 A1 | 5/2006 | Gabriel et al. | |
| 2006/0155705 A1 * | 7/2006 | Kamper et al. | 707/8 |
| 2006/0161533 A1 | 7/2006 | Selca et al. | 707/3 |
| 2006/0168325 A1 * | 7/2006 | Wood et al. | 709/238 |
| 2006/0168557 A1 | 7/2006 | Agrawal et al. | 717/104 |
| 2006/0200499 A1 | 9/2006 | Bhatia et al. | |
| 2006/0242189 A1 | 10/2006 | Leetaru et al. | 707/102 |
| 2006/0259506 A1 | 11/2006 | Kim | 707/102 |
| 2007/0005630 A1 | 1/2007 | Selca et al. | 707/102 |
| 2007/0005634 A1 | 1/2007 | Selca et al. | 707/102 |
| 2007/0038702 A1 | 2/2007 | Taylor et al. | |
| 2007/0198657 A1 | 8/2007 | Saliba et al. | 709/219 |

FOREIGN PATENT DOCUMENTS

| | | |
|---|---|---|
| WO | WO 00/60484 | 10/2000 |

OTHER PUBLICATIONS

Strong, Craeg, "Release Information", http://www.zope.org/Members/arielpartners/CVSFile/readme/document_view, Apr. 2003, 6 pp.

Onion, Fritz, "Understanding Paths in ASP.NET", Informit.com, http://www.informit.com/articles/article.asp?p=101145&redir=1, Sep. 2003, 4 pp.

Anonymous, "Method and Apparatus for Automatic Character Line Fill of Decimal Fields." IBM Technical Disclosure Bulletin vol. 36, No. 10, pp. 155-156, Oct. 1993.

Miastkowski, S. "Excel 5.0—a Quick-start Guide to Using Excel's Powerful New Features." Macworld vol. 11, No. 10, pp. 146-151, Oct. 1994.

Microsoft Corp. Help File on 'Series' 'Repeated Entries', and 'Auto Fill' (screen shot) of Microsoft Excel 97 (1996), taken Mar. 2001, 6 pp.

Crew, Ed, ed. "Lesson in Excel 97: Lesson One . . . ", Web page tutorial on Excel 97 downloaded from pathways.uwe.ac.uk/Edict/Excel/Excel-01.asp on Mar. 29, 2002, 6 pp.

Sonic.net. "Microsoft Excel 5.0 (Tips on Using MS Excel 5.0 Repeat Entries)" downloaded from www.sonic.net/.about.sbaumann/excel.html on Apr. 2, 2002, 5 pp.

Microsoft Office 2000/Visual Basic Programmer's Guide, "Creating Dynamic Reports with Query Tables in Excel", http://msdn.microsoft.com/library/en-us/odeopg/html/deconcreatingdynamicreportswithq . . . , downloaded May 16, 2006, 2 pp.

Khor, "Microsoft Office Excel 2003 Preview", Jun. 2003, http://msdn.microsoft.com/library/en-us/odc_x12003_ta/html/odc_xlov.asp?frame=true, downloaded May 16, 2006, 19 pp.

Davidson, "Professional SQL Server 2000 Database Design", Wrox Press Ltd., 2001, 464 pp.

U.S. Official Action in U.S. Appl. No. 11/169,856 mailed Oct. 3, 2007.

U.S. Official Action in U.S. Appl. No. 11/231,260 mailed Oct. 16, 2007.

U.S. Official Action in U.S. Appl. No. 11/300,728 mailed Jan. 9, 2008.

"Mapping Windows XP Progessional to Your Business Needs", Microsoft: Windows XP Resource Kits, http://www.microsoft.com/resources/documentation/Windows/XP/all/reskit/en-us/Default.

asp?url=/resources/documentation/Windows/XP/all/reskit/en-us/prba_dwp_tnvo.asp, printed Dec. 15, 2005, 8 pp.

Strong, Craeg, "Release Information", http://www.zope.org/Members/arielpartners/CVSFile/readme/document_view, Apr. 2003, 6 pp.

Onion, Fritz, "Understanding Paths in ASP.NET", Informit.com, http://www.informit.com/articles/article.asp?p=101145&redir=1, Sep. 2003, 4 pp.

U.S. Official Action in U.S. Appl. No. 11/317,648 mailed Apr. 17, 2008.

U.S. Official Action in U.S. Appl. No. 11/231,260, Selca et al., mailed Jul. 18, 2008.

U.S. Official Action in U.S. Appl. No. 11/169,856, Selca et al., mailed Jul. 21, 2008, 7 pgs..

U.S. Official Action mailed Jan. 12, 2009 in U. S. Appl. No. 11/231,260.

EP Search Report in 07763001.0/2201/1984839 mailed May 29, 2009, pp. 1-7.

U.S. Official Action mailed Jul. 31, 2009 in U.S. Appl. No. 11/231,260, pp. 1-23.

EP Examination Report in 07763001.0-2201/1984839 mailed Aug. 7, 2009, pp. 1-4.

Official Action mailed Sep. 25, 2009 in U.S. Appl. No. 11/235,260, pp. 1-23.

Official Action mailed Sep. 25, 2009 in U.S. Appl. No. 11/231,260, pp. 1-23.

Ganapathi, et al., "Why PCs Are Fragile and What We Can Do About It: A Study of Windows Registry Problems", Proceedings of the 2004 International Conference on Dependable Systems and Networks, 2004, 6 pp.

Carvey, "The Windows Registry as a Forensic Resource", Digital Investigation, 2005, pp. 201-205.

EP Summons to Attend Oral Hearing in 07763001.0-2201/1984839 mailed Oct. 29, 2009, pp. 1-9.

EP Decision on Oral Hearing in 07763001.0-/2201/1984839 mailed Mar. 3, 2010, pp. 1-29.

* cited by examiner

REDIRECTION TO LOCAL COPIES OF SERVER-BASED FILES

BACKGROUND

With the advent of distributed computing environments, such as the Internet and intranets, it has become common practice to store various electronic files, such as word processing documents, spreadsheet documents, slide presentation documents, database files, and the like, on a server to which many users may obtain access for using stored files. Server systems have been developed that allow for collaborative working environments where various users may work on a given file or files as a team. Under such systems, a given user may "check out" a document for making edits to the document. While the document is checked out by the editing user, other users are notified that the document is checked out and the other users are prohibited from editing the document until the first user checks the document back into the server. Thus, conflicting edits to the document are prevented.

According to prior systems, a checked out document remains on the server while being edited. That is, the editing user may not check out the document to her local computer for editing the document during an offline session. In order to edit the document in an offline session, the user must copy the document to the local computer, make desired edits, and then manually save the edited document back to the server. Unfortunately, manually saving the edited document to the server requires the user to ensure that changes made to the document during the offline session do not conflict with changes made to the server copy during the offline session. Moreover, the document manually saved to the server by the editing user will bear a different version than the version previously saved to the server which may have been edited by others during the offline session. Such a process greatly decreases, if not eliminates altogether, the benefits of the collaborative working environment.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing for mapping server files to corresponding locally stored copies of server files and for redirecting an application to a server copy or to a corresponding local copy for opening a most up-to-date or most reliable version of the desired file. According to one embodiment, a server-based document may be "checked out" and saved to a local computer for editing during an offline session. When the document is checked out to the local computer, a mapping is generated for relating a path to the server file with a path to the local copy. In addition, a date/time stamp for the last edit written to the server file is generated for future comparison with the local copy. According to one embodiment, the mapping and date/time stamp data may be stored in the local computer for optimization.

When a subsequent attempt to open either the server file or the local copy of the server file is received, a determination is made as to whether a mapping exists to a local copy. If a mapping does not exist, the server copy is opened. If a mapping to a local copy does exist, but a corresponding local copy is not available, the server file is opened. If a mapping to a local copy exists and the local copy is available, but the local copy is not checked out to the requesting user, then the server file is opened. If a mapping to the local copy exists and the local copy is available, but a review of the date/time stamp for the last written edits to the server file indicates that the server file has been changed since the local copy was stored to the local computer, then the server file is opened. If a mapping to the local copy exists, the local copy is available, and no changes have been made to the server file since the local copy was stored to the local computer, then the file open request is directed to the local copy, and the local copy is opened. According to an embodiment, a warning may be provided to the requesting user if the server file is opened when a local copy is also available but is not opened as set forth above.

According to another embodiment, a property may be set on the local copy to notify the requesting application of the server file to which the local copy is associated so that the local copy may be located by the requesting application regardless of the storage location on the local computer at which the local copy is stored.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to mapping server-based files to corresponding locally stored file copies and to directing a requesting application to a server file or to a local copy of a corresponding server file for opening a most up-to-date or most reliable version of the desired file. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
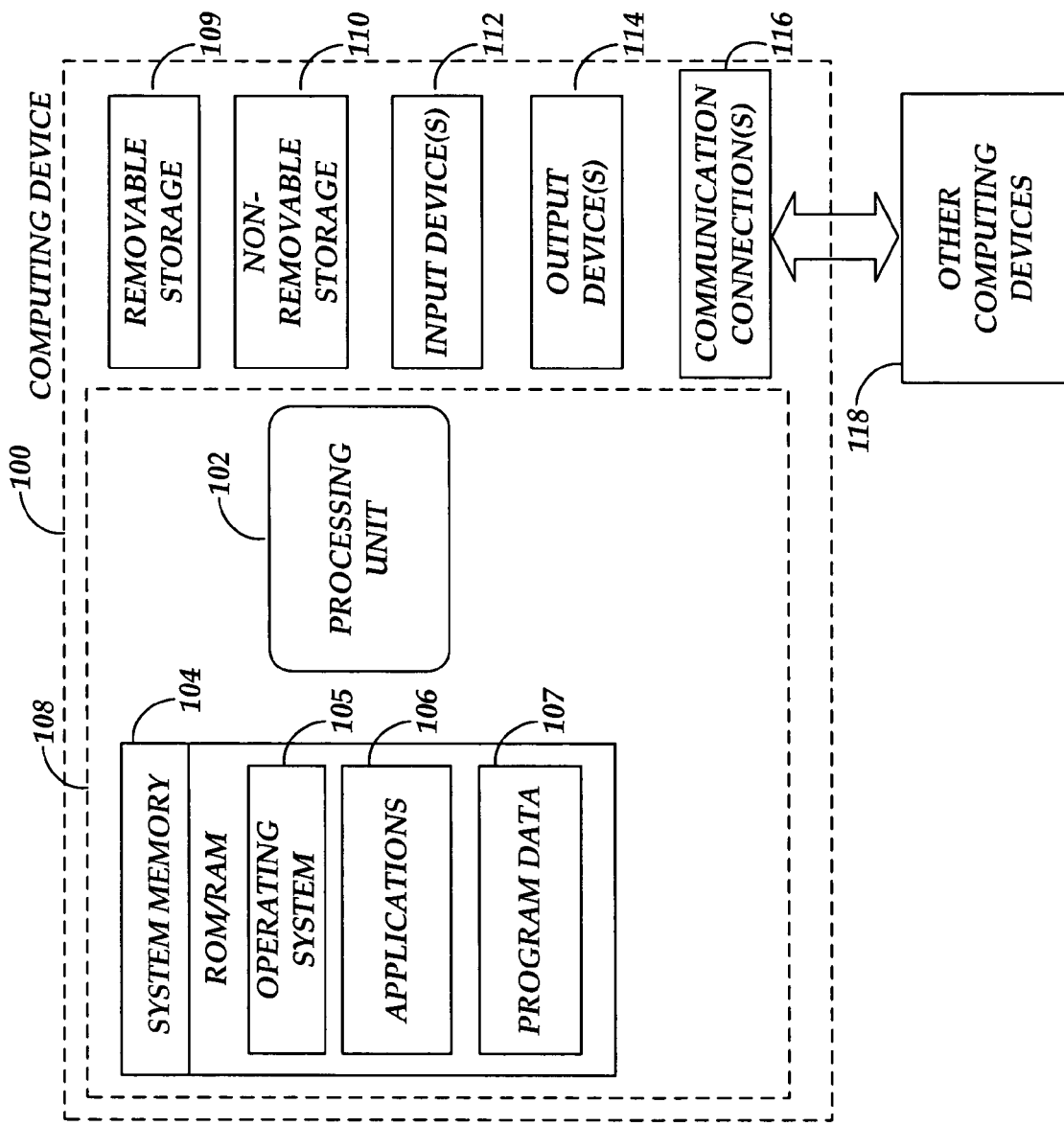
FIG. 1 illustrates an exemplary computing operating environment.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of software applications, such as an electronic mail program, a calendaring program, an Internet browsing program, and the like. An example of such programs is OUTLOOK® manufactured by MICROSOFT CORPORATION. The application 106 may include a number of other types software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the application 106 is illustrative of any software application operable for requesting the opening of a server file or local copy of a server file according to embodiments of the invention described herein.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
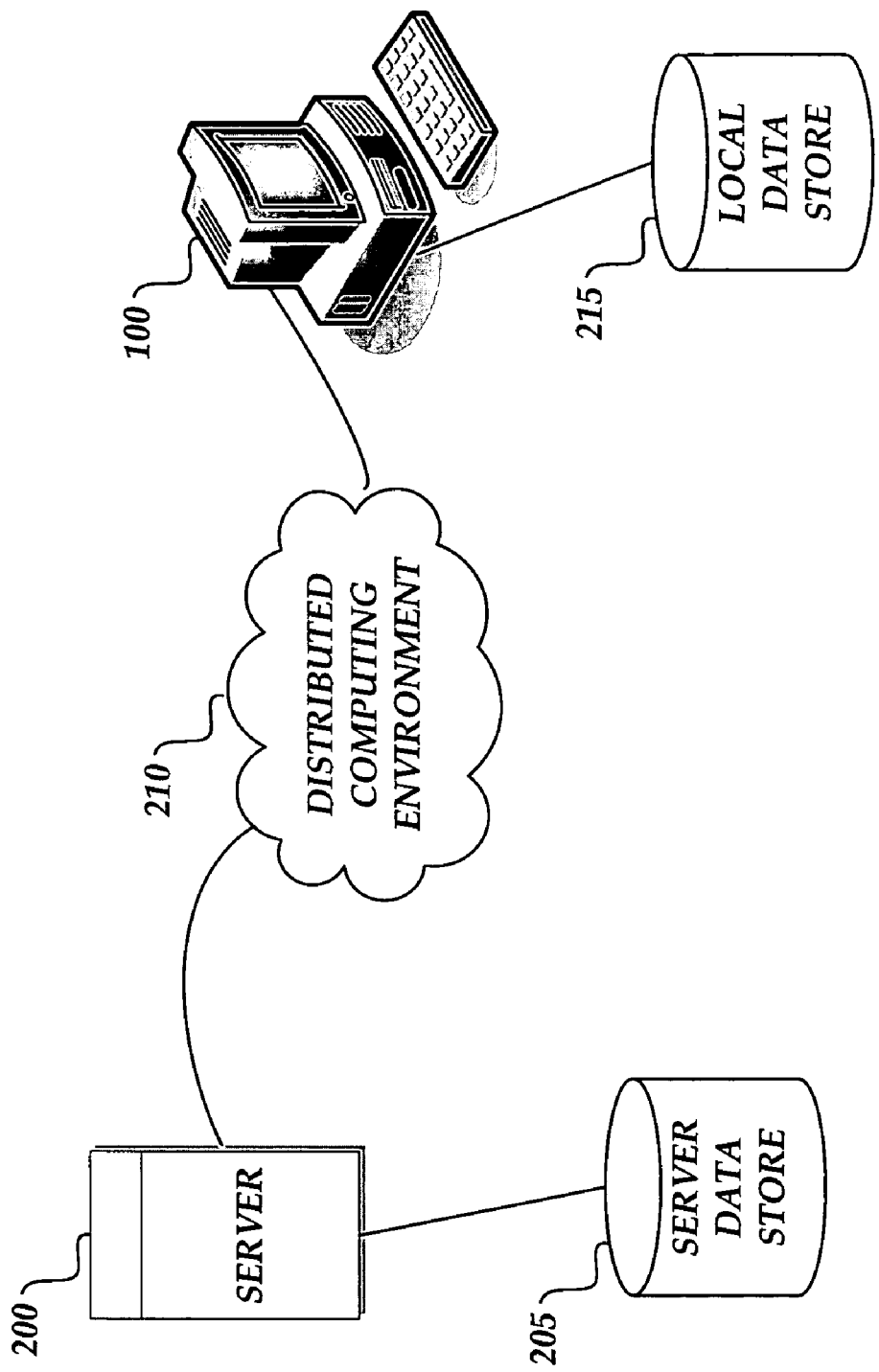
FIG. 2 is a simplified block diagram illustrating a relationship between a server and a local computer.

Referring now to FIG. 2, a distributed computing environment is illustrated. A server computer 200 is illustrated for two-way communication with a local computer 100 across a distributed computing environment 210. The server data store 205 is illustrative of a memory location at which data stored to the server 200 may be maintained. According to embodiments, the distributed computing environment 210 may be the Internet or may be one or more distributed computing networks such as organization intranets, local area networks, wide area networks, and the like. As briefly described above, a variety of electronic documents, for example, word processing documents, spreadsheet documents, slide presentation documents, database files, desktop publishing documents, and the like, may be stored on the server 200 for use by one or more users from local computers 100 across the distributed computing environment 210.

According to one embodiment, documents stored on the server 200 are stored in a database operative to allow the documents to be accessed and utilized by one or more users operating in a collaborative working environment. An example of such a database for enabling a collaborative working environment is SHAREPOINT® manufactured by MICROSOFT CORPORATION. For example, a word processing document may be stored on the server 200 that contains a company proposal for an upcoming project by a department of the company. Various members of a work team may access the document from time to time to make changes to the document or to add information to the document. According to embodiments of the present invention, when a given user desires to edit a given document on the server 200, the user may "check out" the document so that only the requesting user may make edits or other changes to the document while the document is checked out to the requesting user. That is, during the period in which the document is checked out by the requesting user, other users may not open the document and make edits or other changes to the document. Thus, conflicting edits or changes to the document by different users are prevented.

Once a user has completed all her desired edits or other changes to a checked out document, the user may check the document back into the server, and the checked in document is then available for editing by other users. As described in detail below, files maintained on the server 200 may be checked out by a requesting user and may be stored to a local computer 100 with which the requesting user may edit the locally stored files during an offline editing session. That is, the requesting user may check out a desired file from the server 200 and operate on the file with the local computer 100 after the local computer has been disconnected from the server 200 during an offline editing session. When the user reconnects her local computer 100 to the server 200, the previously checked out document may be checked back into the server 200, and edits or other changes made to the document at the local computer 100 during the offline session are published to the server 200.

According to embodiments of the present invention, when a document is checked out from the server 200 to the local computer 100, as described above, a copy of the checked out file is stored in a local data store 215 of the local computer 100. According to one embodiment, the locally stored file copy is saved to a "drafts" folder in the local data store for providing users an efficient way to locate and edit locally stored files. When the local copy of the file is stored at the local computer 100, a mapping is generated for mapping a path to the server file to a path to the local copy of the file. According to embodiments, the mapping generated for the stored file contains data for directing a requesting application to each stored file. A server path is included in the mapping data and includes a value that may be utilized by a requesting application, for example, a word processing application, for locating the server file at the server 200. For example, the server path may be a uniform resource locator (URL) address for the server file for directing a requesting application to the server file at the server 200.

A local copy path is included in the mapping, and the path is a value that may be utilized by a requesting application for locating the local copy of the server file at the local computer 100. A last write time value is included in the mapping data for the server file. The server file "last write time" is a date/time stamp associated with the date and time at which last edits or changes were made to the server file prior to the date and time at which the server file was checked out to the local computer 100. According to embodiments, the last write time for the server file is recorded and is utilized by a requesting application as a reference point for determining whether changes have been made to the server file after the local copy of the server file has been stored to the local computer 100.

When a subsequent attempt is made to open either the server file or the local copy, as described below, a determination may be made as to whether changes were made to the server file after the local copy of the file was stored to the local computer 100. If the server file has been changed since the local copy of the file was stored to the local computer 100, then the server copy of the file may be opened in response to a file open request so that a requesting user is provided the most up-to-date version of the server file then stored at the server. As will be described below, in such a case, the local copy of the file may contain edits or other changes that are now in conflict with changes made to the server file after the local copy of the file was stored to the local computer 100, but provision of the server file under this circumstance is required to prevent confusion as to the status of the server file maintained for the collaborative working environment.

According to one embodiment, when the local copy of the server file is stored at the local computer 100, a property is set on the local copy of the file for identifying the server file to which the local copy is associated. Thus, a subsequent requesting application may locate the local copy of the file in the local data store 215 of the local computer 100 regardless of the particular location in the local data store 215 at which the local copy of the file is stored.

After the mapping from server file to local copy is generated, as described above, storage for the mapping is established at the local computer 100. According to one embodiment, the operating system registry of the local computer 100 may be utilized. The server file path may be stored as a registry key, and the local copy path may be stored as a default value for that registry key so that subsequent requests for either the server file or the local copy will default to the path for the local copy for first determining whether a path to the local copy exists before determining whether the server file must be opened, as described below. The last write time for the server file may be stored as a string value in the registry for comparing last edit dates/times for the server file with edit dates/times of the server file potentially made after the local copy was stored, as described above. As should be appreciated, the mapping data may be stored in the operating system registry for optimization purposes, or alternatively, the mapping data may be stored in any number of other local data stores 215 for access by a requesting application during a file open operation directed to server files or corresponding local copies. According to another embodiment, the mapping is also stored in the associated file. Thus, if a user moves the file to different memory locations on the local computer 100, the mapping data is always available with the file for directing a requesting application back to the server via the mapping, as described herein.

Figure 3:
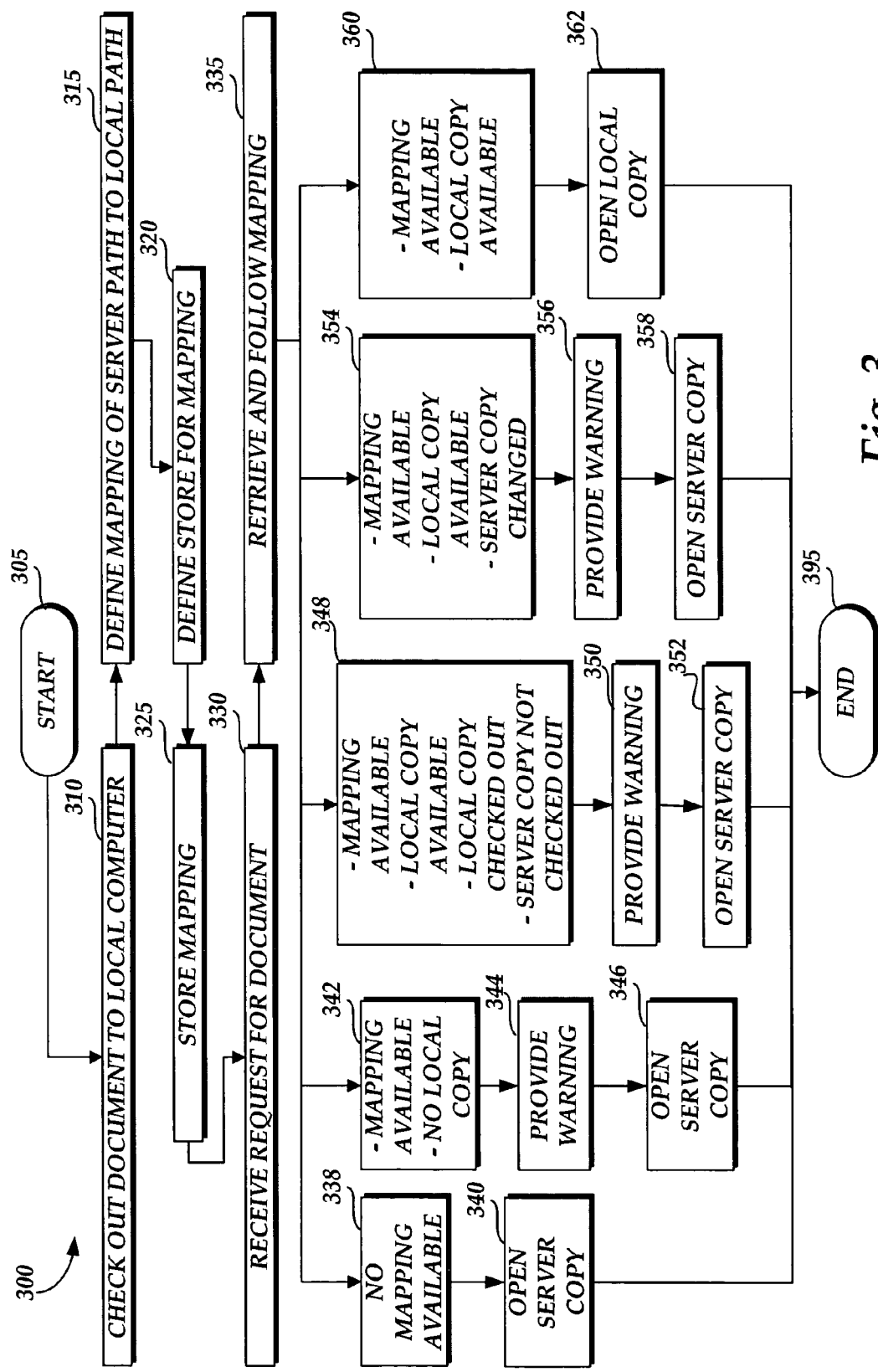
FIG. 3 is a flow diagram illustrating a logical flow of a file opening operation.

Referring now to FIG. 3, a logical flow of an example operation of embodiments of the present invention is described. The routine 300 begins at start operation 305 and proceeds to check out operation 310. At checkout operation 310, a user checks out a document from the server 200 to her local computer 100, as described above. For example, the user may check out a word processing document containing a memorandum the user is working on in a collaborative working environment with four other members of a work team in the user's organization. As described above, checking out the document by the requesting user allows the user to make changes to the document and prevents other members of the user's team from checking out the same document to make changes to the document during the period in which the requesting user has checked out the document for editing.

When the desired document is checked out, the document is stored to the local computer 100 as described above. When the local copy of the document is stored to the local computer 100, a property is set on the local copy for allowing a subsequently requesting application, for example, a word processing application, spreadsheet application, and the like, to locate the locally stored copy of the document regardless of a particular location in the local data store 215 at which the local copy is stored.

At mapping operation 315, a mapping of the server-based document to the local copy of the requested document is generated. As described above, data comprising the mapping includes a path to the server file, a path to the locally stored copy, and a date/time stamp for the "last write time" for the server copy of the document.

At operation 320, a storage location at the local computer 100, for example, at the local data store 215, is defined for storing the mapping data generated at operation 315. As described above, according to one embodiment of the present invention, the storage location for the mapping data is defined at the operating system registry for the local computer 100 for purposes of optimization. That is, storing the mapping data in the operating system registry allows the mapping data to be efficiently and quickly retrieved by a requesting application when required. At mapping storage operation 325, the mapping data generated for the locally stored document copy is stored.

Once the local copy of the server-based document is stored, and the mapping is generated and stored, the requesting user may operate on the locally stored document in an online session with the server 200. That is, edits or other changes made to the local copy may be automatically published to the server 200 during a period in which the document is checked out by the current user to the local computer 100. According to embodiments of the present invention, the user may also operate on the locally stored document during an offline editing session. For example, the user may desire to store the local document on a laptop computer 100 for editing the document during a flight from one location to another location. Once the user reconnects her computer 100 to the server 200 via the distributed computing environment 210, the user may synchronize the locally stored document along with any edits or changes back to the server 200 by "checking in" the locally stored document to the server 200, as described above.

Once the user reconnects her computer to the server 200 after an offline editing session, a request for either the server file or the locally stored copy of the server file may be received by a requesting application. For example, the user who originally stored the local copy of the document to her local computer, or a different user may attempt to check out the subject document from the server 200, or the user may attempt to open the subject document from her local computer 100. For example, a user may attempt to launch the subject document via a requesting application, for example, a word processing application, a spreadsheet application, a slide presentation application, and the like.

At document request operation 330, a request is received at the server 200 or at the local computer 100 for the subject document via a requesting application. At mapping retrieval operation 335, the requesting application requests the desired document via the path to the requested document at the server 200. That is, the requesting document attempts to open the requested document at a memory location accessible via the server path for the requested document. When the requesting application attempts to retrieve and open the requested document via the server path for the requested document, the requesting application will be redirected to the mapping data for the requested document if the requested document has been previously checked out to and potentially edited at a local computer 100.

At operation 338, the requesting application follows the server path for the desired document. If a mapping has been generated for the desired document, mapping the server path for the desired document to a local copy path for the desired document, then the requesting application will be redirected to the local copy path as a default path, as described above. However, if no mapping is available for the requested document, which means that the requested document has not been checked out to a local computer 100, then the routine proceeds directly to file open operation 340, and the server file for the requested document is opened by the requesting application.

Referring back to operation 342, if the requesting application follows the server path for the requested document and determines that a mapping is available for the requesting document, the requesting application is then redirected to a path for the local copy of the document, as described above. When the requesting application follows the path to the local copy, a determination is made as to whether the local copy is available. If the local copy of the document is not available, for example, the local copy has been moved, deleted, checked out to a different location, etc., the routine proceeds to operation 344, and a warning may be provided to the requesting user. For example, a dialog box may be presented to the requesting user to let the user know that a local copy of the document has been checked out and stored locally, but that the local copy is not available for opening by the requesting application.

According to one embodiment, the user may be provided additional options via the warning dialog. For example, the user may be allowed to retry the opening of the local copy, the user may be allowed to abort the file-opening request, or the user may be directed to open the server copy of the document. As a default operation, in this situation, the routine proceeds to operation 346, and the server copy is opened in response to the file open request.

Referring back to operation 348, if the requesting application determines that a mapping is available, and upon following the path to the locally stored copy, a determination is made that a local copy is available, the requesting application next determines whether the local copy is or is not checked out. For example, if a first user checked out the requested document to her local computer 100, and the first user then went on an extended absence from the office during which the first user failed to reconnect to the server 200 to check the locally stored document back into the server, a subsequent requesting user may attempt to open the document. If the subsequent requesting user determines that the first user has been absent from the document for an excessive period, the subsequent requesting user may decide to break the file checkout system by overriding the system to allow the second requesting user to check out the server-based copy of the document.

According to an embodiment of the present invention, mapping data for the previously stored local copy may be updated to indicate that the checkout system has been broken and that the subject document has been checked out by the second requesting user. Thus, if the first user returns from the extended absence and attempts to open the previously stored local document copy, then at operation 348, the user will be notified that a mapping is available, a local copy is available, but that the document has now been checked out by another user. After a warning is provided to the requesting user at operation 350, the server copy of the document is provided to the requesting user. Thus, even if the first user has made edits or other changes to the locally stored document during the first user's extended checkout session, the first user is now required to open and utilize the server copy that is now the most up-to-date and the most reliable copy because the server-based copy may have been edited or otherwise changed by the second user.

Referring back to operation 354, if the file open request results in a determination that a mapping to a local copy is available, that the local copy of the document is available, but that the server copy has changed with respect to the local copy, a warning is provided to the user at warning operation 356. As described above, at the time a local copy of the server document is stored to the local computer 100, a date/time stamp for the last write time associated with last edits or changes made to the server document prior to storing the document locally is stored with other mapping data. When the requesting application is directed to the mapping data for the requested document, as described herein, the previously stored last write time is considered an anticipated last write time for the server document. The requesting application then follows the server path back to the server-based document and retrieves a current last write time for the requested document. A comparison is then made between the previously stored or anticipated last write time for the requested document with the current last write time for the requested document. If the current last write time for the server document is later than the previously stored or anticipated last write time, then a determination is made that the server-based document has been changed by a subsequent user after the local copy of the server-based document was checked out to the local computer 100. Because the server-based copy of the requested document includes edits or other changes that were not included in the document when the local copy of the document was stored to the local computer 100, the routine proceeds to file open operation 358, and the server-based copy is opened by the requesting application as the most up-to-date version of the document. Thus, any edits or other changes made to the locally stored copy of the document by the requesting user must be made to the opened server copy of the document after the requesting user checks out the local server copy of the document at operation 358.

Referring to operation 360, if during the file open operation, a determination is made that a mapping from the server file to a local copy is available, that a local copy is available, that the document has not been checked out by another user, and that the server copy has not been changed, then the routine proceeds to operation 362, and the locally stored copy of the document is launched in response to the file open request.

As described herein, embodiments of the present invention are directed to mapping a server file to a corresponding locally stored copy of a server file and to redirecting an application to a server file or to a corresponding local copy for opening a most up-to-date or most reliable version of the desired file. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer-implemented method of mapping a server file to a locally stored copy of the server file, comprising:
    receiving a selection for opening a server file to a local computing device remote from a server containing the server file;
    storing a local copy of the server file at the local computing device;
    generating a mapping from the server file at the server to the local copy at the local computing device, the mapping comprising data which comprises a path to the server file at the server, a path to the local copy at the local computing device, and a last write time comprising a date/time stamp associated with a date and a time at which last edits or changes were made to the server file prior to a date and a time at which the server file was checked out to the local computing device, wherein the path to the server file comprises a uniform resource locator (URL) address, and wherein the last write time for the server file is stored as a string value in an operating system registry of the local computing device;
    after generating the mapping, receiving a selection for opening either the server file or the local copy of the server file;
    in response to receiving the selection for opening either the server file or the local copy of the server file, determining whether a mapping is available from the server file to the local copy of the server file; and
    if a mapping is available from the server file to the local copy of the server file, retrieving the local copy at the local computing device via the mapping by redirecting a requesting application of the server file from the path to the server file at the server to the path to the local copy at the local computing device, and opening the local copy.

2. The method of claim 1, wherein generating the mapping includes: determining the path to the server file at the server; and determining the path to the local copy at the local computing device.

3. The method of claim 2, wherein generating the mapping further includes determining the last write time.

4. The method of claim 1, in addition to generating the mapping, storing a property with the local copy for notifying the requesting application of the server file to which the local copy is associated so that the local copy may be located by the requesting application regardless of the storage location at the local computing device at which the local copy is stored.

5. The method of claim 3, further comprising storing the mapping at the local computing device.

6. The method of claim 5, wherein storing the mapping at the local computing device includes storing the mapping at an operating system registry at the local computing device.

7. The method of claim 1, wherein if a mapping is not available from the server file to the local copy of the server file, then retrieving the server file from the server, and opening the server file.

8. The method of claim 7, wherein if the server file is opened, providing a warning to a requesting user that the server file is being opened instead of a local copy of the server file.

9. The method of claim 1, prior to retrieving the local copy at the local computing device, parsing the mapping and following the path to the local copy at the local computing device to determine whether the local copy is available.

10. The method of claim 9, wherein if the local copy is not available, then retrieving the server file from the server, and opening the server file.

11. The method of claim 9, further comprising determining whether changes have been made to the server file since the local copy was stored at the local computing device.

12. The method of claim 11, wherein if changes have been made to the server file since the local copy was stored at the local computing device, then retrieving the server file from the server, and opening the server file.

13. The method of claim 12, wherein determining whether changes have been made to the server file since the local copy was stored at the local computing device includes parsing the mapping for the date/time stamp.

14. The method of claim 13, further comprising querying the server to determine whether any changes have been made to the server file after the last write time.

15. The method of claim 9, wherein if the local copy is available, determining whether the local copy is checked out to another user, and if the local copy is checked out to another user, then retrieving the server file from the server, and opening the server file.

16. A computer readable storage medium containing computer executable instructions which when executed by a computer perform a method of mapping a server file to a locally stored copy of the server file, comprising:

receiving a selection for opening a server file to a local computing device remote from a server containing the server file;

storing a local copy of the server file at the local computing device;

generating a mapping from the server file at the server to the local copy at the local computing device, the mapping comprising data which comprises a path to the server file at the server, a path to the local copy at the local computing device, and a last write time comprising a date/time stamp associated with a date and a time at which last edits or changes were made to the server file prior to a date and a time at which the server file was checked out to the local computing device, wherein the path to the server file comprises a uniform resource locator (URL) address wherein the last write time for the server file is stored as a string value in an operating system registry of the local computing device;

after generating the mapping, receiving a selection for opening either the server file or the local copy of the server file;

in response to receiving the selection for opening either the server file or the local copy of the server file, determining whether a mapping is available from the server file to the local copy of the server file; and if a mapping is available from the server file to the local copy of the server file, retrieving the local copy at the local computing device via the mapping by redirecting a requesting application from the path to the server file at the server to the path to the local copy at the local computing device, and opening the local copy.

17. The computer readable storage medium of claim 16, wherein generating the mapping includes:

determining the path to the server file at the server;

determining the path to the local copy at the local computing device;

determining the last write time; and storing the mapping at the local computing device.

18. The computer readable storage medium of claim 17, wherein if a mapping is not available from the server file to the local copy of the server file, then retrieving the server file from the server, and opening the server file.

19. A computer readable storage medium containing computer executable instructions which when executed by a computer perform a method of mapping a server file to a locally stored copy of the server file, comprising:

receiving a selection for opening a server file to a local computing device remote from a server containing the server file;

storing a local copy of the server file at the local computing device;

generating a mapping from the server file at the server to the local copy at the local computing device, the mapping comprising data which comprises a path to the server file at the server, a path to the local copy at the local computing device, and a last write time comprising a date/time stamp associated with a date and a time at which last edits or changes were made to the server file prior to a date and a time at which the server file was checked out to the local computing device, wherein the path to the server file comprises a uniform resource locator (URL) address wherin the last write time for the server is stored as a string value in an operating system registry of the local computing device;

after generating the mapping, receiving a selection for opening either the server file or the local copy of the server file;

in response to receiving the selection for opening either the server file or the local copy of the server file, determining whether a mapping is available from the server file to the local copy of the server file; and if a mapping is available from the server file to the local copy of the server file and if no changes have been made to the server file since the local copy was stored at the local computing device, then retrieving the local copy at the local computing device via the mapping by redirecting a requesting application from the path to the server file at the server to the path to the local copy at the local computing device, and opening the local copy.

20. The method of claim 1, wherein if a mapping is not available from the server file to the local copy of the server file, providing a warning to a requesting user that the server file is being opened instead of a local copy of the server file, and then retrieving the server file from the server, and opening the server file.

* * * * *